J. W. HADFIELD.
Rocket.

No. 51,176.

Patented Nov 28. 1865.

Witnesses.

Inventor.
John W Hadfield

UNITED STATES PATENT OFFICE.

JOHN W. HADFIELD, OF NEWTOWN, NEW YORK.

IMPROVEMENT IN SKY-ROCKETS.

Specification forming part of Letters Patent No. 51,176, dated November 28, 1865.

*To all whom it may concern:*

Be it known that I, JOHN W. HADFIELD, of Newtown, in the county of Queens and State of New York, have invented a new and useful Improvement in Sky-Rockets; and I do hereby declare that the following is a full, clear, and exact description thereof, which will enable others skilled in the art to make and use the same, reference being had to the accompanying drawings, forming part of this specification, in which—

Figure 1:
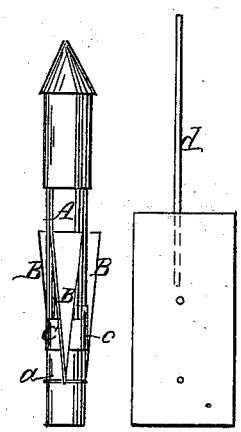
Figure 2:
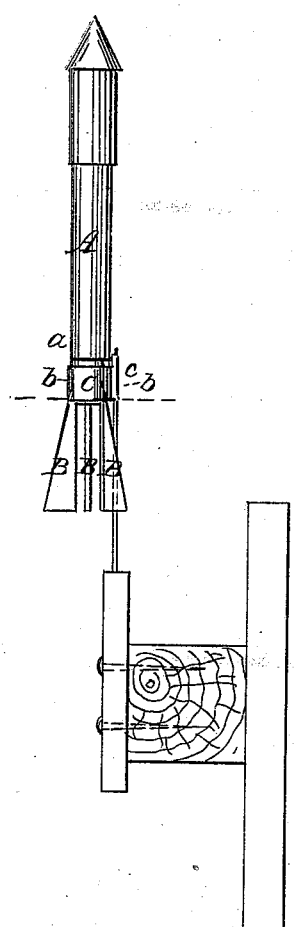
Figure 3:
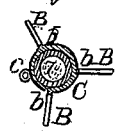

Figure 1 represents a side elevation of my invention, showing the rocket and guide-pin ready for packing. Fig. 2 is a similar view of the same, showing the same in position to go off. Fig. 3 is a transverse section of the same, the line $x\,x$, Fig. 2, indicating the plane of section.

Similar letters of reference indicate like parts.

This invention consists, first, in the application to a rocket of reversible wings arranged so that the same can be turned in when the rocket is to be packed and turned out when the rocket is to be fired; second, in the arrangement of a sleeve provided with notches and with a loop or eye, in combination with the reversible wings, in such a manner that by the action of the notches in the sleeve the wings, when turned out, are firmly held in position, and at the same time, by the loop, an opportunity is afforded to attach the rocket to the rod; third, in the use of a short piece of wire for the guide-rod in place of the ordinary stick, said piece of wire being fastened to a piece of wood which, when the rocket is to be fired, is nailed fast to a fence or post, and which, together with the wire, does not exceed in length the rockets, and can be readily packed with the same in a box not longer than the rockets.

A represents a rocket, to which three wings, B, are secured by a wire, $a$. Said wings are so arranged that they can be turned into the position shown in Fig. 1 when not used and turned out to the position shown in Fig. 2 when the rocket is to be fired. When turned out to their working position they are retained by a sleeve, C, provided with three (more or less) notches, $b$, each of which catches over the inner or small end of one of the wings, as shown in Fig. 2. This sleeve is fitted loosely on the body of the rocket, and it is provided with a loop, $c$, intended to receive the pin $d$, which takes the place of the ordinary stick generally used to give to the rocket the desired direction. Said pin is short and secured to a base of wood, whereby it can be readily nailed to a fence or post or any other suitable place, as shown in Fig. 2. This guide-pin, together with its base, is not longer than the rocket itself when the wings are turned in, and the whole can be packed up conveniently in a short box.

When a rocket is to be fired, the pin $d$ is secured in position, as shown in Fig. 2, the wings are turned out and fastened by the sleeve, the loop of the sleeve is passed over the pin, and the rocket is ready to be fired. By the wings it is compelled to rise in a straight course, and it is not liable to fly off at a tangent. The pin, being firmly held in position, can be used for a large number of rockets, and the cost of the entire improvement is so trifling that it can be left entirely out of the question.

I do not claim, broadly, the application of wings to a rocket; but

I claim as new and desire to secure by Letters Patent—

1. Making the wings of a rocket reversible, substantially as and for the purposes described.

2. The sleeve C, in combination with the rocket A and reversible wings B, constructed and operating substantially as and for the purpose set forth.

3. The sleeve C, in combination with the guide-pin $d$, constructed and operating substantially as and for the purpose described.

The above specification of my invention signed by me this 14th day of October, 1865.

JOHN W. HADFIELD.

Witnesses:
M. M. LIVINGSTON,
C. L. TOPLIFF.